United States Patent
Lee et al.

(10) Patent No.: US 9,276,272 B2
(45) Date of Patent: Mar. 1, 2016

(54) METAL SEPARATOR FOR SOLID OXIDE REGENERATIVE FUEL CELL COATED WITH CONDUCTIVE SPINEL OXIDE FILM, METHOD FOR PRODUCING THE SAME AND SOLID OXIDE REGENERATIVE FUEL CELL INCLUDING THE SAME

(71) Applicant: KOREA INSTITUTE OF SCIENCE AND TECHNOLOGY, Seoul (KR)

(72) Inventors: Sung-Il Lee, Gyeonggi-do (KR); Ji-Won Son, Seoul (KR); Jong Ho Lee, Seoul (KR); Hae June Je, Seoul (KR); Kyung Joong Yoon, Seoul (KR); Hae-Weon Lee, Seoul (KR); Byung Kook Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 132 days.

(21) Appl. No.: 14/153,250

(22) Filed: Jan. 13, 2014

(65) Prior Publication Data

US 2015/0118597 A1    Apr. 30, 2015

(30) Foreign Application Priority Data

Oct. 30, 2013  (KR) .......................... 10-2013-0129890

(51) Int. Cl.
  *H01M 8/02*       (2006.01)

(52) U.S. Cl.
  CPC .................................. *H01M 8/0217* (2013.01)

(58) Field of Classification Search
  None
  See application file for complete search history.

(56) References Cited

U.S. PATENT DOCUMENTS

2010/0178586 A1\*  7/2010  Yang et al. ..................... 429/489
2013/0230792 A1   9/2013  Wilson et al.

FOREIGN PATENT DOCUMENTS

KR    20090129665 A    12/2009
WO    WO 2011096939 A1 \*  8/2011

OTHER PUBLICATIONS

Gavrilov et al. "Investigations of Mn—Co—O and Mn—Co—Y—O coatings deposited by the magnetron sputtering on ferritic stainless steels", Surface & Coatings Technology 206 (2011) 1252-1258. Available online Sep. 6, 2011.\*

Yang et al. "(Mn, Co)3O4 spinel coatings on ferritic stainless steels for SOFC interconnect applications", International Journal of Hydrogen Energy 32 (2007) 3648-354. Available online Oct. 12, 2006.\*

Jung Pyung Choi, et al; "Development of MnCoO coating with new aluminizing process forr planar SOFC stacks", International Journal of Hydrogen Energy; vol. 36, Issue 7, Apr. 2011; pp. 4549-4556.

\* cited by examiner

*Primary Examiner* — Gregg Cantelmo
(74) *Attorney, Agent, or Firm* — Ladas & Parry LLP

(57) ABSTRACT

Disclosed is a metal separator for a solid oxide regenerative fuel cell coated with a conductive spinel oxide film. In the conductive spinel oxide film, yttrium is added to a manganese-cobalt spinel oxide to suppress growth of an insulating oxide film on the surface of the metal separator and volatilization of metal. In the conductive oxide film coated on the metal separator, yttrium is segregated at the grain boundaries of the spinel so that migration of oxygen through the grain boundaries can be suppressed. Therefore, the surface of the metal separator can be protected from exposure to the atmosphere and water vapor when the solid oxide regenerative fuel cell is operated at high temperature. In addition, poisoning of electrodes by metal volatilization from the surface of the metal separator and growth of an insulating oxide film on the surface of the metal separator can be prevented. Therefore, the stability of the solid oxide regenerative fuel cell stack can be markedly improved.

18 Claims, 3 Drawing Sheets

METAL SEPARATOR FOR SOLID OXIDE REGENERATIVE FUEL CELL COATED WITH CONDUCTIVE SPINEL OXIDE FILM, METHOD FOR PRODUCING THE SAME AND SOLID OXIDE REGENERATIVE FUEL CELL INCLUDING THE SAME

CROSS-REFERENCE TO RELATED APPLICATIONS

This application claims priority under 35 U.S.C. §119 to Korean Patent Application No. 10-2013-0129890 filed on Oct. 30, 2013 in the Korean Intellectual Property Office, the invention of which is incorporated herein by reference in its entirety.

BACKGROUND OF THE INVENTION

1. Field of the Invention

The present invention relates to a metal separator for a solid oxide regenerative fuel cell coated with a conductive spinel oxide film. More specifically, the present invention relates to a metal separator for a solid oxide regenerative fuel cell coated with a conductive spinel oxide film in which yttrium is added to a manganese-cobalt spinel oxide to suppress growth of an insulating oxide film on the surface of the metal separator and volatilization of metal, and a method for producing the metal separator coated with the conductive spinel oxide film.

2. Description of the Related Art

A unitized regenerative fuel cell (URFC) is an energy conversion and storage system that can work both as a fuel cell and as a water electrolyzer. Since the commercialization of fuel cells, unitized regenerative fuel cells (URFCs) have attracted considerable attention as next-generation fuel cells and have been emerging as the most promising topics playing a leading role in fuel cell research.

A unitized regenerative fuel cell (URFC) operates both in a fuel cell mode and in an electrolyzer mode. Electrical energy is produced in the fuel cell mode, which is the same as the operation mode of an existing fuel cell. In the electrolyzer mode, the URFC supplies electrical energy to electrolyze water as a byproduct of the fuel cell reaction into hydrogen and oxygen. The regenerated hydrogen and oxygen are supplied to the fuel cell to produce electrical energy. This is the very core of URFC technology. Due to the use of regenerated hydrogen, the utilization efficiency of hydrogen energy of the URFC is estimated to be significantly higher by about 10-15% than that of an existing fuel cell.

A solid oxide regenerative fuel cell (SORFC) using a ceramic membrane as an electrolyte is considered the most efficient type of URFC. In the solid oxide regenerative fuel cell, a solid oxide fuel cell (SOFC) for clean energy conversion with high efficiency is integrated with a solid oxide electrolysis cell (SOEC) for hydrogen production, which operates in the reverse mode to the SOEC. The solid oxide regenerative fuel cell is capable of high capacity supply power and hydrogen production/storage/utilization. Due to these advantages, the solid oxide regenerative fuel cell is suitable for stable supply of non-uniform low-quality power of renewable energy on demand. That is, the solid oxide regenerative fuel cell can use excess power of renewable energy to produce and store hydrogen when power demand is low, and can use the stored hydrogen as a fuel to supply power when power demand is high. In comparison with a regenerative fuel cell, the solid oxide regenerative fuel cell operating at a relatively high temperature of 800° C. is advantageous from thermodynamic and kinetic aspects and possesses relatively high efficiency and performance. Under such circumstances, reaction problems between materials, development of new materials, improvement of electrode characteristics, stack fabrication, and evaluation of operating tests are emerging as key issues in research and development.

However, performance deterioration of a variety of elements when exposed to high temperatures is the most serious obstacle to the commercialization of solid oxide regenerative fuel cells. Particularly, metal separators tend to be more susceptible to oxidation than ceramic materials. This tendency leads to poor performance of stacks, which is a very serious situation. In an SORFC stack, a metal separator electrically connects a cathode of one cell to an anode of another cell and serves and separates the two electrodes to prevent mixing of air and hydrogen. An Fe—Cr alloy as a main material for the metal separator is highly resistant to heat and oxidation. However, when the Fe—Cr alloy is exposed to an oxidizing atmosphere, i.e. air or water vapor, at a temperature as high as 800° C. at which a solid oxide regenerative fuel cell is operated, for a long time, an insulating oxide film with high electrical resistance grows on the metal surface, resulting in increased electrical resistance and performance deterioration of the stack.

When the Fe—Cr alloy comes into contact with oxygen at high temperature, a highly volatile chromium oxide ($CrO_X$) is formed and the chromium (Cr) atoms are volatilized from the metal and deposited on the surface of electrodes, resulting in a reduction in the number of reaction sites of the electrodes and performance deterioration of the electrodes.

In an attempt to prevent growth of an insulating oxide film and minimize performance deterioration of a solid oxide regenerative fuel cell stack by chromium poisoning, research is being conducted on a technique for coating a conductive oxide film on the surface of a metal separator to prevent direct contact between the metal separator and atmospheric oxygen. However, current techniques for coating conductive oxide films suffer from limitations because the conductive oxide films are not dense enough to block gas permeation and are very difficult to form on metals.

SUMMARY OF THE INVENTION

Therefore, the present invention is intended to provide a conductive spinel oxide film having a new composition that can be coated on the surface of a metal separator to prevent the surface of the metal separator from direct contact with atmospheric oxygen, a method for forming the conductive oxide film, and a solid oxide regenerative fuel cell including the conductive oxide film.

One aspect of the present invention provides a metal separator for a solid oxide regenerative fuel cell stack wherein the metal separator is coated with a conductive spinel oxide film including a novel spinel compound represented by Formula 1:

$$Mn_{3-X}Co_{X-Z}Y_ZO_{4-\delta} \qquad (1)$$

wherein X is a real number satisfying 0<X<3, Z is a real number satisfying 0<Z<3, and δ is a real number satisfying 0≤δ<4.

According to one embodiment of the present invention, the compound represented by Formula 1 may be $Mn_{1.45}Co_{1.45}Y_{0.1}O_4$, and the metal separator may be made of a material selected from titanium, stainless steel, copper, nickel, nickel alloys, and iron-chromium alloys, preferably, an iron-chromium alloy.

Another aspect of the present invention provides a method for producing the metal separator coated with the conductive spinel oxide film, the method including: (a) mixing raw material powders, milling the mixture, and calcining the milled mixture to prepare a conductive oxide; (b) milling the conductive oxide to prepare a powder of the conductive oxide; (c) preparing a paste including the conductive oxide powder and depositing the paste on a metal separator by screen printing; and (d) annealing the paste-deposited metal separator.

In step (a), the raw material powders are manganese dioxide ($MnO_2$), cobalt (Co), and yttrium oxide ($Y_2O_3$) powders, and are mixed in a mixed solvent of hydrogen peroxide, glycine, water, and nitric acid.

According to one embodiment of the present invention, in step (a), the calcination may be performed at 750 to 800° C. to remove residual carbon.

In step (b), the conductive oxide, together with a dispersant, is dispersed in ethanol and the dispersion is milled.

According to one embodiment of the present invention, the dispersant may be used in an amount of 2 to 5% by weight, based on the weight of the conductive oxide.

In step (c), the conductive oxide powder is dispersed in a dispersion solvent containing a dispersant, a binder and a plasticizer are added to the dispersion, and the resulting mixture is mixed.

According to one embodiment of the present invention, the dispersant may be used in an amount of 2 to 5% by weight, based on the weight of the conductive oxide powder.

According to one embodiment of the present invention, 50%, 25%, and 25% of the conductive oxide powder may be sequentially dispersed in the dispersion solvent at intervals of 2 to 3 hours, and 50%, 25%, and 25% of each of the binder and the plasticizer may be sequentially added to the dispersion at intervals of 2 to 3 hours.

According to one embodiment of the present invention, the dispersion solvent may be cooled to room temperature before dispersion of the conductive oxide powder therein. The reason for this cooling is to prevent the solvent from being vaporized by a temperature rise during milling of the conductive oxide powder, avoiding a change in the viscosity of the dispersion.

In step (d), the annealing may be performed by the following primary and secondary annealing steps:

(i) heating the paste-deposited metal separator at a rate of 0.5 to 1.5° C./min to 950 to 1050° C., followed by annealing in a reducing atmosphere of 96% argon and 4% $H_2$ for 20 to 30 hours; and (ii) cooling the primarily annealed metal separator at a rate of 0.5-1.5° C./min to 750 to 850° C., followed by annealing in a nitrogen atmosphere for 20 to 30 hours.

In the conductive oxide film coated on the metal separator, yttrium is segregated at the grain boundaries of the spinel so that migration of oxygen through the grain boundaries can be suppressed. Therefore, the surface of the metal separator can be protected from exposure to the atmosphere and water vapor when the solid oxide regenerative fuel cell is operated at high temperature. In addition, poisoning of electrodes by metal volatilization from the surface of the metal separator and growth of an insulating oxide film on the surface of the metal separator can be prevented. Therefore, the stability of the solid oxide regenerative fuel cell stack can be markedly improved.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
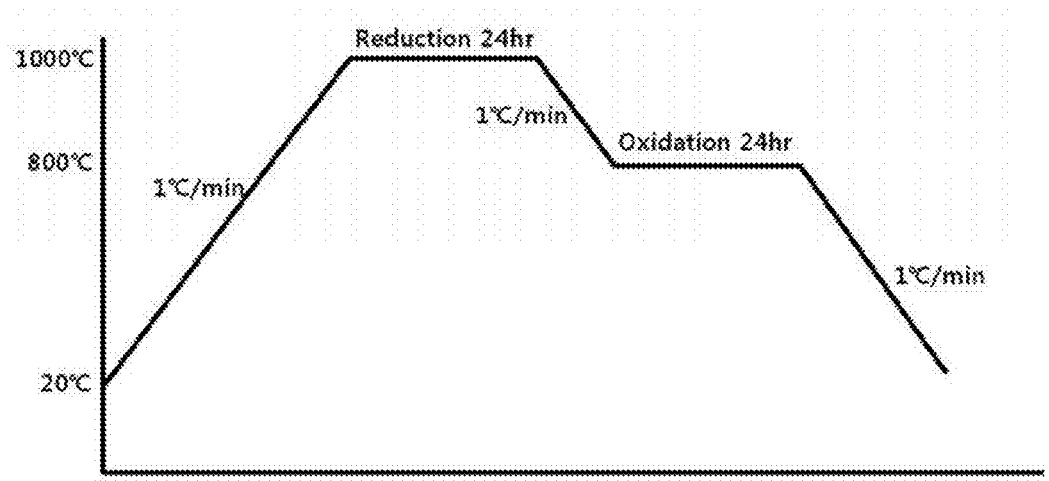
FIG. 1 is a graph showing a procedure for annealing a conductive spinel oxide coating according to one embodiment of the present invention.
Figure 2:
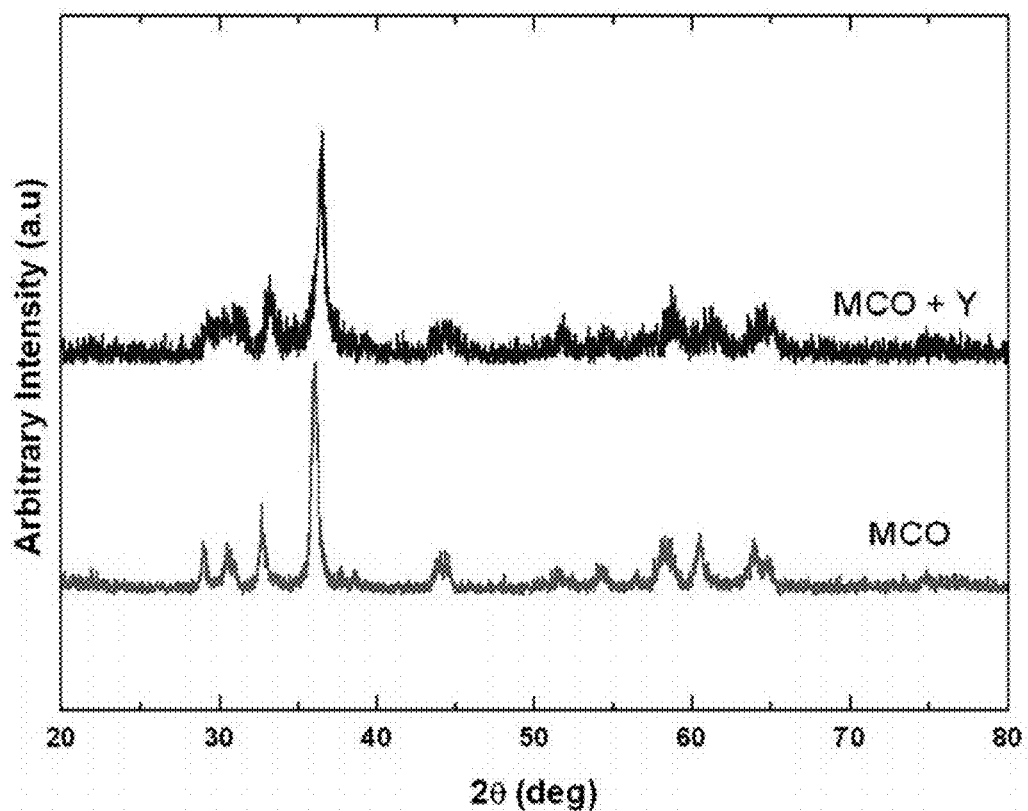
FIG. 2 shows XRD patterns of a conductive spinel oxide coating formed in Comparative Example 1 and a coating formed in Comparative Example 1.

The present invention will now be described in more detail.

A metal separator made of an Fe—Cr alloy is the most severe cause deteriorating the performance of a conventional solid oxide regenerative fuel cell stack operating at high temperature. Exposure of the metal separator is exposed to air and water vapor at high temperature leads to the growth of an insulating oxide film on the surface of the metal separator, bringing about increased electrical resistance. Another problem is chromium volatilization, which causes performance deterioration of electrodes by poisoning.

In one aspect, the present invention provides a metal separator for a solid oxide regenerative fuel cell coated with a conductive oxide film wherein the conductive oxide film has a novel composition prepared by adding yttrium to a manganese-cobalt spinel composite and the metal separator is made of an Fe—Cr.

The yttrium is segregated at the grain boundaries of the spinel composite so that migration of oxygen through the grain boundaries can be suppressed to protect the metal separator. In addition, the conductive oxide film coated on the metal separator is formed by reductive annealing at high temperature. This annealing enables densification of the coating to achieve excellent electrical properties of the coating. Furthermore, when exposed to air or water vapor, growth of an insulating oxide film and volatilization of chromium can be effectively prevented, contributing to a marked improvement in the stability of the solid oxide regenerative fuel cell stack.

The novel composition of the conductive oxide film is represented by Formula 1:

$$Mn_{3-X}Co_{X-Z}Y_ZO_{4-\delta} \quad (1)$$

wherein X is a real number satisfying 0<X<3, Z is a real number satisfying 0<Z<3, and δ is a real number satisfying 0≤δ<4.

The conductive oxide film is formed by primary annealing at 950 to 1050° C. in a reducing atmosphere and secondary annealing at 750 to 850° C. in an oxidizing atmosphere.

In one preferred embodiment of the present invention is that the composition may be represented by $Mn_{1.45}Co_{1.45}Y_{0.1}O_4$ and, the metal separator is made of an iron-chromium alloy, specifically Crofer® 22 APU (APU=Auxiliary Power Unit) trademarked by ThyssenKrupp VDM GmbH which is about 22% chromium.

In another aspect, the present invention provides a method for producing the metal separator coated with the conductive spinel oxide film.

Specifically, the method includes:

(a) mixing raw material powders, milling the mixture, and calcining the milled mixture to prepare a conductive oxide;

(b) milling the conductive oxide to prepare a powder of the conductive oxide;

(c) preparing a paste including the conductive oxide powder and depositing the paste on a metal separator by screen printing; and (d) annealing the paste-deposited metal separator.

The raw material powders used in step (a) are manganese dioxide ($MnO_2$), cobalt (Co), and yttrium oxide ($Y_2O_3$) powders.

The raw material powders are mixed in a mixed solvent of hydrogen peroxide, glycine, water, and nitric acid.

Nitric acid is used to dissolve the manganese dioxide ($MnO_2$) and cobalt (Co) as cation sources, hydrogen peroxide is added to dissolve the manganese dioxide, and glycine is added in such an amount that the ratio of the glycine to nitrates is adjusted to 0.55:1.

In one embodiment of the present invention, in step (a), the calcination may be performed at 750 to 800° C. to remove residual carbon.

In step (b), the conductive oxide, together with a dispersant, is dispersed in ethanol and the dispersion is milled.

In one embodiment of the present invention, the dispersant may be used in an amount of 2 to 5% by weight, based on the weight of the conductive oxide.

In step (b), an attrition mill is used to divide aggregates of the conductive oxide into primary particles using. When the attrition mill is rotated, the powder aggregates collide with zirconia balls. As a result of the collision, the powder aggregates are divided into individual particles and the dispersant is adsorbed to the surface of the particles to prevent the particles from reaggregating.

If the dispersant is used in an excess amount, the excess dispersant remaining after being adsorbed to the surface of the particles tend to aggregate, that is, it serves as a binder, resulting in an increase in viscosity. Meanwhile, if the dispersant is in a small amount, some of the particles are not adsorbed by the dispersant and tend to reaggregate. The amount of the dispersant should be determined taking into consideration the size of the aggregates as the milling proceeds. In one embodiment of the present invention, the dispersant may be used in an amount of 2 to 5% by weight, based on the weight of the conductive oxide.

In step (c), the conductive oxide powder is dispersed in a dispersion solvent containing a dispersant, a binder and a plasticizer are added to the dispersion, and the resulting mixture is mixed.

Specifically, the paste of the conductive spinel oxide powder prepared in step (b) is prepared by the following procedure. First, a solvent and a dispersant are added to the conductive spinel oxide powder. Then, the dispersant in the form of a powder is sufficiently dissolved in the solvent by milling for 1 hour. The solvent may be α-terpineol that is less volatile at room temperature.

The dispersant is added in an amount of 2 to 5% by weight, preferably 2 to 3% by weight, based on the weight of the conductive oxide powder. After the dispersant is completely dissolved in the solvent, the conductive oxide powder is added to the solution. The conductive oxide powder may be added all at one time. In this case, however, the powder may aggregate. In step (c), the conductive oxide powder is added in portions successively. For example, 50%, 25%, and 25% of the conductive oxide powder may be sequentially added at intervals of 2 to 3 hours. After sufficient mixing of the resulting mixture for 12 hours, the binder and the plasticizer are added. The same applies to the addition of the binder and the plasticizer. That is, 50%, 25%, and 25% of each of the binder and the plasticizer are sequentially added to the dispersion. The resulting mixture is sufficiently mixed for 24 hours.

The solvent may be vaporized by a temperature rise during milling of the conductive oxide powder, causing a change in the viscosity of the dispersion. Accordingly, the dispersion solvent is cooled to room temperature before addition of the powder.

In step (d), the annealing may be performed by the following primary and secondary annealing steps:

(i) heating the paste-deposited metal separator at a rate of 0.5 to 1.5° C./min to 950 to 1050° C., followed by annealing in a reducing atmosphere of 96% argon and 4% $H_2$ for 20 to 30 hours; and (ii) cooling the primarily annealed metal separator at a rate of 0.5-1.5° C./min to 750 to 850° C., followed by annealing in a nitrogen atmosphere for 20 to 30 hours.

When a conventional metal separator is exposed to an oxidizing atmosphere at high temperature, the metal reacts with atmospheric oxygen. This reaction leads to the growth of an insulating oxide film on the surface of the metal separator and causes an increase in the area specific resistance (ASR) of the metal separator with time. In contrast, according to the present invention, the high-temperature annealing of step (i) further promotes sintering of the conductive oxide film coated on the metal separator. In addition, the reductive annealing can suppress growth of an insulating oxide film on the surface of the metal separator during sintering, leading to a marked reduction in the area specific resistance (ASR) of the metal separator.

The densification of the coating in a reducing atmosphere in step (i) minimizes contact between the metal separator and oxygen upon subsequent oxidative annealing in step (ii). As a result, volatilization of metal (i.e. chromium (Cr)) from the metal separator can be suppressed. Therefore, performance deterioration of electrodes can be minimized without poisoning of the electrodes by the chromium.

The present invention will be explained in more detail with reference to the following examples. However, these examples are not to be construed as limiting or restricting the scope and spirit of the invention. It is to be understood that based on the teachings of the present invention including the following examples, those skilled in the art can readily practice other embodiments of the present invention whose specific experimental data are not available.

EXAMPLES

Preparative Example 1

Formation of Conductive Oxide Film (1) Step 1: Synthesis of Conductive Oxide

In this step, a conductive oxide was prepared using a glycine nitrate process (GNP). Table 1 shows the composition for synthesis of the conductive oxide.

Specifically, 63.03 g of manganese dioxide ($MnO_2$), 42.72 g of cobalt (Co), and 19.15 g of yttrium oxide ($Y_2O_3$) as raw material powders were added to a mixed solution of 750 g of DI water, 556.97 g of nitric acid ($HNO_3$), 450 g of hydrogen peroxide ($H_2O_2$), and 225.21 g of glycine. After stirring for 24 h, water was evaporated at 250° C. The resulting mixture was heated to 500° C. on a hot plate to induce spontaneous combustion by the glycine and nitrates. As a result, a conductive oxide powder was obtained. Thereafter, the conductive oxide powder was trimmed into spherical primary particles by ball milling for 2-3 days, dried, followed by calcination at 800° C. for 4 hr to remove carbon remaining in the course of the powder synthesis.

TABLE 1

| Composition for synthesis of conductive oxide | Amount (g) |
|---|---|
| $MnO_2$ | 63.03 |
| Co | 42.72 |
| $Y_2O_3$ | 19.15 |
| DI water | 750 |
| $HNO_3$ | 556.97 |
| $H_2O_2$ | 450 |
| Glycine | 225.21 |

(2) Step 2: Preparation of Conductive Oxide Powder

In this step, powder aggregates of the conductive oxide prepared in step 1 were divided into primary particles by ball milling using an attrition mill.

Specifically, as shown in Table 2, 100 g of the conductive oxide prepared in step 1 was dispersed in 100 g of ethanol in a weight ratio of 1:1, 200 g of the dispersion was mixed with 800 g of 0.3 Φ balls, a dispersant was added thereto, followed by milling for 60 min. The dispersant was used in an amount of 2 wt %, based on the weight of the dispersion. After milling, the particle size was measured. The dispersant was added by 1 wt % depending on the dispersion effect. Milling was continued for 2 h while observing the milling effect at intervals of 30 min. Thereafter, ball milling was performed for 24 hr, followed by drying, yielding a conductive spinel oxide powder represented by $Mn_{1.45}Co_{1.45}Y_{0.1}O_4$ (MCO+Y).

TABLE 2

| Dispersion condition | Amount (g) |
|---|---|
| Conductive oxide | 100 |
| Ethanol | 100 |
| 0.3F balls | 800 |
| Dispersant | 4 |

(3) Step 3: Coating

In this step, a paste of the $Mn_{1.45}Co_{1.45}Y_{0.1}O_4$ powder obtained in step 2 was prepared and coated on the surface of a metal separator made of a Cr—Fe alloy Crofer® 22 APU (APU=Auxiliary Power Unit) trademarked by ThyssenKrupp VDM GmbH by screen printing. The composition of the paste is shown in Table 3.

TABLE 3

| Paste composition | Amount (g) |
|---|---|
| $Mn_{1.45}Co_{1.45}Y_{0.1}O_4$ | 10 |
| α-terpineol | 8 |
| Dispersant | 0.3 |
| Plasticizer | 0.2 |
| Binder | 0.3 |

Specifically, the dispersant in the form of a powder was added to α-terpineol, milled for 1 hr and sufficiently dissolved to prepare a dispersion, and then 50%, 25%, and 25% of the $Mn_{1.45}Co_{1.45}Y_{0.1}O_4$ powder were sequentially added to the dispersion at intervals of 2 hr. The dispersant was used in an amount of 2 wt %, based on the weight of the $Mn_{1.45}Co_{1.45}Y_{0.1}O_4$ powder. The resulting solution was sufficiently mixed for 12 h, and the binder and the plasticizer were added thereto. To the mixture, divided portions (50%, 25%, and 25%) of each of the binder and the plasticizer were sequentially added. The resulting mixture was sufficiently mixed for 24 hr to obtain a paste. Due to the possibility that α-terpineol as the solvent may be vaporized by a temperature rise during milling of the powder, causing a change in the viscosity of the dispersion, the dispersion solvent was cooled before addition of the powder.

Next, the paste was coated on the surface of a metal separator Crofer® 22 APU (APU=Auxiliary Power Unit) trademarked by ThyssenKrupp VDM GmbH by using a screen printer. In a screen printing process, there is a need to control the amount of a paste passing through a screen and ensure uniformity of the paste on a substrate. Thus, drying of the paste is a very important operation. The amount of the paste passing through the screen is controlled depending on the mesh size of the screen and may also be affected by the viscosity of the paste, the pressure applied to a squeeze, and the moving speed of the squeeze.

In the present invention, the paste was placed on an S/T 325 mesh and a squeeze was moved at constant pressure and speed to form the paste on the substrate. At this time, stepped portions may be formed on the surface of the paste by the mesh marks. The paste was leveled to ensure uniformity thereof. The leveling is a process in which an organic solvent is used to rearrange the particles of the paste. After sufficient rearrangement of the particles for 1 h, the organic solvent was removed in a dry oven at 80° C. The drying conditions are important because uniformity of the particles should be ensured during evaporation of the organic solvent. Since the drying begins from the surface of the paste and a temperature gradient may exist in the dry oven. In the present invention, the temperature of the dry oven was kept as constant as possible. If the sample is inclined, portions of the sample will not be uniformly dried. In the present invention, the balance of the sample was kept for equal drying of the sample. After coating of one side of the sample, the other side thereof should also be coated. In the present invention, a mold for fixing the lateral sides of the sample was used in order to prevent the previously coated portion from reaching the bottom, avoiding damage to the coated side.

(4) Step 4: Annealing

The shrinkage behavior of the $Mn_{1.45}Co_{1.45}Y_{0.1}O_4$ (MCO+Y) powder containing yttrium (Y) was confirmed to occur at a higher temperature than that of the $Mn_{1.5}Co_{1.5}O_4$ (MCO) powder. Thus, in this step, annealing was conducted at 1000° C., which is higher by 200° C. than the annealing temperature of $Mn_{1.5}Co_{1.5}O_4$ (800° C.).

When a protective film in the form of a spinel oxide is reduced in an atmosphere of 96% Ar and 4% $H_2$ to ensure a binding strength to a metal substrate, bonds of the spinel are cleaved into MnO and CoO. The CoO is rapidly converted to Co. In this course, cracks may be formed due to a difference in the coefficient of thermal expansion between CoO and MnO. The cracks become large in size with increasing temperature. In view of the foregoing, in this step, the paste-deposited metal separator was heated to 1000° C. at a rate of 1° C./min and was then subjected to reduction while maintaining the same temperature for 24 hr.

After the reductive annealing, the metal separator was cooled to 800° C. at a rate of 1° C./min to prevent cracking and separation by thermal shock, the atmosphere was converted using $N_2$ gas, followed by oxidation for 24 hr.

After oxidation, the temperature was cooled to room temperature at a rate of 1° C./min to ensure a time sufficient for the recombination of MnO and CoO into the spinel and to protect against thermal shock. As a result, a final metal separator Crofer® 22 APU (APU=Auxiliary Power Unit) trademarked by ThyssenKrupp VDM GmbH which is coated with the $Mn_{1.45}Co_{1.45}Y_{0.1}O_4$ (MCO+Y, 1000° C. reduction/800° C. oxidation) conductive spinel oxide film.

This annealing procedure is shown in FIG. 1.

Comparative Example 1

A metal separator coated with an $Mn_{1.5}Co_{1.5}O_4$ (MCO, 800° C. reduction/800° C. oxidation) conductive oxide film was produced in the same manner as in Preparative Example 1, except that yttrium oxide ($Y_2O_3$) was not added to the raw material powders and both the reductive annealing and oxidative annealing were conducted at a temperature of 800° C.

Comparative Example 2

A metal separator coated with an $Mn_{1.45}Co_{1.45}Y_{0.10}O_4$ (MCO+Y, 800° C. reduction/800° C. oxidation) conductive oxide film was produced in the same manner as in Preparative Example 1, except that both the reductive annealing and oxidative annealing were conducted at a temperature of 800° C.

Experimental Example 1

Analysis of XRD Patterns

The XRD patterns of the conductive spinel oxide film ($Mn_{1.45}Co_{1.45}Y_{0.1}O_4$, MCO+Y) formed in Preparative Example 1 and the conductive spinel oxide film ($Mn_{1.5}Co_{1.5}O_4$, MCO) formed in Comparative Example 1 were analyzed. The analytical results showed that the spinel powder of Preparative Example 1 had a single phase.

Experimental Example 2

Evaluation of Electrical Properties

The area specific resistance (ASR) values of the metal separator coated with the conductive spinel oxide protective film produced in Preparative Example 1 were measured to confirm the electrical properties of the coating in an oxidizing atmosphere at high temperature.

Specifically, the conductive spinel oxide protective film was coated to a predetermined thickness on both surface of the metal separator Crofer® 22 APU (APU=Auxiliary Power Unit) trademarked by ThyssenKrupp VDM GmbH having dimensions of 5 mm (w)×5 mm (l)×8 mm (h). For current collection, a Pt mesh and a Pt paste were brought into contact with the coating, followed by pressurization. After the Pt wire was connected to the mesh, ASR values were measured at 800° C., which is a typical operating temperature of an actual fuel cell, for 500 hr by the 2-point 4-probe method.

Figure 3:
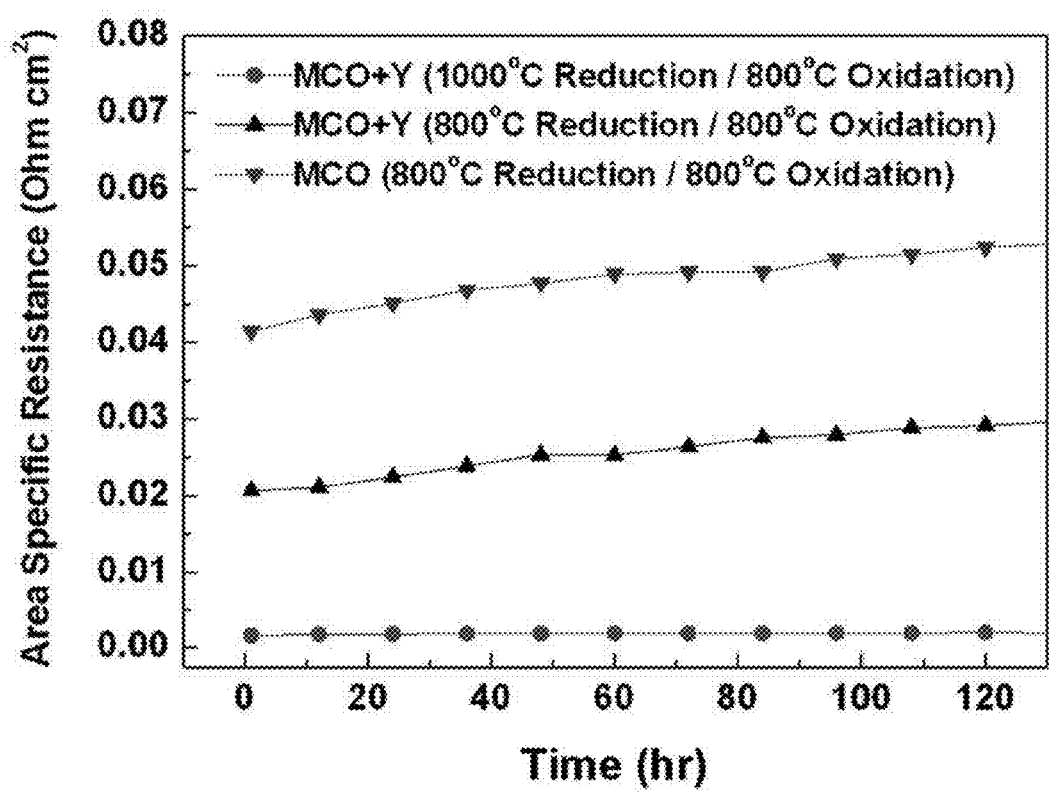
FIG. 3 is a graph showing the area specific resistance (ASR) values of a conductive spinel oxide coating formed in Preparative Example 1 and coatings formed in Comparative Examples 1-2, confirming the electrical conductivity of the coatings.

FIG. 3 shows ASR values of the conductive spinel oxide protective films having different spinel compositions formed under different annealing conditions in Preparative Example 1 and Comparative Examples 1-2.

When a metal separator is exposed to an oxidizing atmosphere at high temperature, the metal reacts with atmospheric oxygen. This reaction leads to the growth of an insulating oxide film on the surface of the metal separator and causes an increase in the ASR of the metal separator with time. The ASR values of the MCO coating of the metal separator having undergone reduction at 800° C./oxidation at 800° C., which are general annealing conditions, are indicated by ▼ (Comparative Example 1). The addition of yttrium oxide (Comparative Example 2, ▲) was confirmed to decrease the ASR values to about half those of the MCO coating. This is because yttrium oxide was segregated at the grain boundaries of the spinel, and as a result, migration of oxygen through the grain boundaries was suppressed.

The ASR values of the coated metal separator produced in Preparative Example 1 (●) were greatly decreased. This is because the high-temperature annealing promoted sintering of the spinel and the reductive annealing suppressed the growth of an insulating oxide film on the surface of the metal separator during sintering.

In conclusion, yttria was segregated at the grain boundaries in the conductive spinel oxide ($Mn_{1.45}Co_{1.45}Y_{0.1}O_4$) coating, so that migration of oxygen through the grain boundaries was suppressed and thus direct contact between the Fe—Cr alloy and atmospheric oxygen was prevented, which was effective in suppressing the growth of an insulating oxide film on the metal surface and volatilization of the Cr.

Experimental Example 3

Analysis of SEM Images

The surface microstructures of the spinel coatings having undergone reductive annealing at different temperatures and the distribution of Cr ions in the spinel coatings were analyzed through SEM images.

Figure 4:
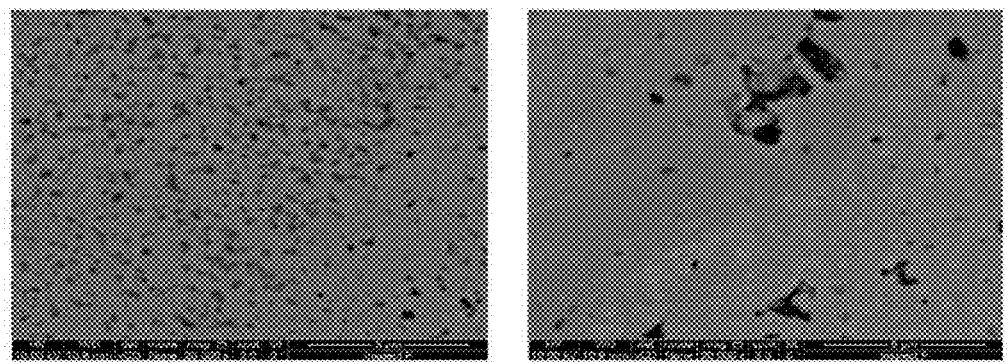
FIG. 4 shows SEM images of surface microstructures of a coating having undergone 800° C. reduction/800° C. oxidation in Comparative Example 2 (left) and a spinel coating having undergone 1000° C. reduction/800° C. oxidation in Preparative Example 1 (right)

FIG. 4 shows SEM images of the surface microstructures of the coating having undergone 800° C. reduction/800° C. oxidation in Comparative Example 2 (left) and the surface of the spinel coating having undergone 1000° C. reduction/800° C. oxidation in Preparative Example 1 (right).

As shown in FIG. 4, a considerable number of residual pores were observed in the coating having undergone reduction at 800° C., whereas a considerably dense structure was observed in the coating layer having undergone reduction at 1000° C. From these observations, it was concluded that reductive annealing at 1000° C. could effectively suppress the growth of an insulating oxide layer on the surface of the metal separator.

Figure 5:
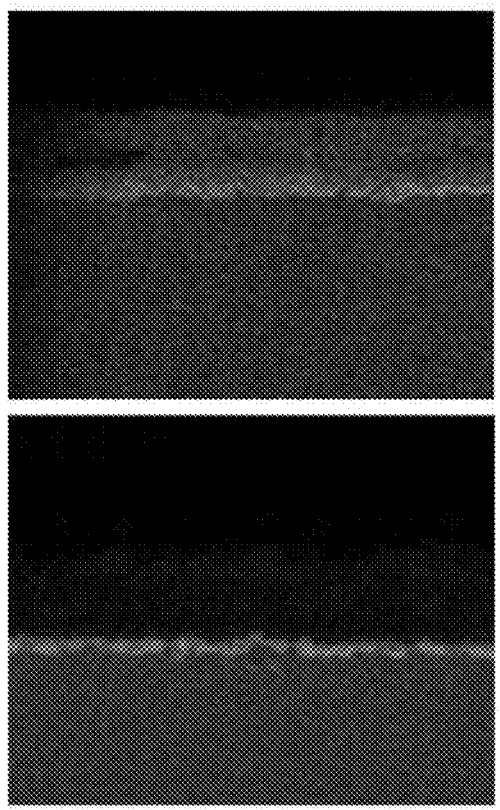
FIG. 5 shows images showing the distribution of Cr ions in a coating having undergone 800° C. reduction/800° C. oxidation in Comparative Example 2 (left) and a spinel coating having undergone 1000° C. reduction/800° C. oxidation in Preparative Example 1 (right).

FIG. 5 shows images showing the distribution of Cr ions in the coating having undergone 800° C. reduction/800° C. oxidation in Comparative Example 2 (left) and the spinel coating having undergone 1000° C. reduction/800° C. oxidation in Preparative Example 1 (right).

As can be seen from FIG. 5, a considerable amount of Cr was present in the spinel coating having undergone 800° C. reduction/800° C. oxidation in Comparative Example 2 (left). That is, since the spinel coating did not have a dense structure, a considerable amount of Cr was volatilized from the separator when exposed to the high-temperature oxidizing atmosphere. The Cr volatilization will increase the possibility of performance deterioration of electrodes by chromium poisoning.

In contrast, Cr was not substantially detected in the spinel coating having undergone sintering in a reducing atmosphere at 1000° C. and subsequent annealing in an oxidizing atmosphere at 800° C. That is, the densification of the coating in a reducing atmosphere can minimize contact between the metal separator and oxygen upon the subsequent annealing in an oxidizing atmosphere. As a result, Cr volatilization can be suppressed, thus preventing poisoning of electrodes by chromium and minimizing performance deterioration of the electrodes.

What is claimed is:

1. A method for producing a metal separator for a solid oxide regenerative fuel cell stack wherein the metal separator is coated with a conductive spinel oxide film comprising a compound represented by Formula 1:

$$Mn_{3-X}Co_{X-Z}Y_ZO_{4-\delta} \quad (1)$$

wherein X is a real number satisfying 0<X<3, Z is a real number satisfying 0<Z<3, and δ is a real number satisfying 0≤δ<4, the method comprising:
(a) mixing raw material powders, milling the mixture, and calcining the milled mixture to prepare a conductive oxide;
(b) milling the conductive oxide to prepare a powder of the conductive oxide;
(c) preparing a paste comprising the conductive oxide powder and depositing the paste on a metal separator; and
(d) annealing the paste-deposited metal separator,
wherein the raw material powders are manganese dioxide ($MnO_2$), cobalt (Co), and yttrium oxide ($Y_2O_3$) powders, and are mixed in a mixed solvent of hydrogen peroxide, glycine, water, and nitric acid.

2. The method according to claim 1, wherein, in step (a), the calcination is performed at 750 to 800° C. to remove residual carbon.

3. The method according to claim 1, wherein, in step (c), the paste is deposited by screen printing.

4. A solid oxide regenerative fuel cell comprising the metal separator produced by the method of claim 1.

5. A method for producing a metal separator for a solid oxide regenerative fuel cell stack wherein the metal separator is coated with a conductive spinel oxide film comprising a compound represented by Formula 1:

$$Mn_{3-X}Co_{X-Z}Y_ZO_{4-\delta} \quad (1)$$

wherein X is a real number satisfying 0<X<3, Z is a real number satisfying 0<Z<3, and δ is a real number satisfying 0≤δ<4, the method comprising:
(a) mixing raw material powders, milling the mixture, and calcining the milled mixture to prepare a conductive oxide;
(b) milling the conductive oxide to prepare a powder of the conductive oxide;
(c) preparing a paste comprising the conductive oxide powder and depositing the paste on a metal separator; and
(d) annealing the paste-deposited metal separator, wherein, in step (b), the conductive oxide, together with a dispersant, is dispersed in ethanol and the dispersion is milled; and the dispersant is used in an amount of 2 to 5% by weight, based on the weight of the conductive oxide.

6. A method for producing a metal separator for a solid oxide regenerative fuel cell stack wherein the metal separator is coated with a conductive spinel oxide film comprising a compound represented by Formula 1:

$$Mn_{3-X}Co_{X-Z}Y_ZO_{4-\delta} \quad (1)$$

wherein X is a real number satisfying 0<X<3, Z is a real number satisfying 0<Z<3, and δ is a real number satisfying 0≤δ<4, the method comprising:
(a) mixing raw material powders, milling the mixture, and calcining the milled mixture to prepare a conductive oxide;
(b) milling the conductive oxide to prepare a powder of the conductive oxide;
(c) preparing a paste comprising the conductive oxide powder and depositing the paste on a metal separator; and
(d) annealing the paste-deposited metal separator,
wherein, in step (c), the conductive oxide powder is dispersed in a dispersion solvent containing a dispersant, a binder and a plasticizer are added to the dispersion, and the resulting mixture is mixed; the dispersant is used in an amount of 2 to 5% by weight, based on the weight of the conductive oxide powder; and 50%, 25%, and 25% of the conductive oxide powder are sequentially dispersed in the dispersion solvent at intervals of 2 to 3 hours, and 50%, 25%, and 25% of each of the binder and the plasticizer are sequentially added to the dispersion at intervals of 2 to 3 hours.

7. The method according to claim 6, wherein the dispersion solvent is cooled to 20 to 30° C. before dispersion of the conductive oxide powder therein.

8. A method for producing a metal separator for a solid oxide regenerative fuel cell stack wherein the metal separator is coated with a conductive spinel oxide film comprising a compound represented by Formula 1:

$$Mn_{3-X}Co_{X-Z}Y_ZO_{4-\delta} \quad (1)$$

wherein X is a real number satisfying 0<X<3, Z is a real number satisfying 0<Z<3, and δ is a real number satisfying 0≤δ<4, the method comprising:
(a) mixing raw material powders, milling the mixture, and calcining the milled mixture to prepare a conductive oxide;
(b) milling the conductive oxide to prepare a powder of the conductive oxide;
(c) preparing a paste comprising the conductive oxide powder and depositing the paste on a metal separator; and
(d) annealing the paste-deposited metal separator, wherein, in step (d), the annealing comprises:
(i) heating the paste-deposited metal separator at a rate of 0.5 to 1.5° C./min to 950 to 1050° C., followed by annealing in a reducing atmosphere of 96% argon and 4% $H_2$ for 20 to 30 hours (primary annealing); and
(ii) cooling the primarily annealed metal separator at a rate of 0.5-1.5° C./min to 750 to 850° C., followed by annealing in a nitrogen atmosphere for 20 to 30 hours (secondary annealing).

9. A method for producing a conductive spinel oxide film coated metal separator, the method comprising:
mixing manganese dioxide ($MnO_2$) powder, cobalt (Co) powder, and yttrium oxide ($Y_2O_3$) powder into a solvent that comprises hydrogen peroxide, glycine, water, and nitric acid to prepare a mixture;
heating the mixture to obtain a conductive oxide;
calcining the conductive oxide;
preparing a conductive oxide powder from the conductive oxide;
depositing a paste of the conductive oxide powder on a metal separator; and
annealing the paste-deposited metal separator to produce the conductive spinel oxide film coated metal separator.

10. The method of claim 9, wherein a relative weight ratio of the manganese dioxide ($MnO_2$) powder:cobalt (Co) powder:yttrium oxide ($Y_2O_3$):water:nitric acid:hydrogen peroxide:glycine used to prepare the mixture comprises about 63:43:19:750:557:450:225 respectively.

11. The method of claim 9, wherein heating comprises:
stirring the mixture for about 24 hours;
evaporating the stirred mixture; and
subjecting the evaporated stirred mixture to about 500° C.

12. The method of claim 9, wherein calcining comprises subjecting the conductive oxide to about 750° C. to 800° C.

13. The method of claim 12, wherein calcining results in removing residual carbon from the conductive oxide.

14. The method of claim 9, wherein preparing the conductive oxide powder comprises
dispersing the conductive oxide and a dispersant into ethanol in which an amount of the dispersant used is about 2 to 5% by weight based on the weight of the conductive oxide;
milling the dispersion comprising the conductive oxide, the dispersant, and the ethanol; and
drying the dispersion to yield the conductive oxide powder.

15. The method according to claim 9, wherein the paste is prepared by:
adding the conductive oxide powder into α-terpineol containing a dispersant to form a dispersion, wherein the dispersant is used in an amount of 2 to 5% by weight based on the weight of the conductive oxide powder;
mixing the dispersion that comprises the conductive oxide powder, the dispersant and the α-terpineol;
adding a binder and a plasticizer to the dispersion to form a resulting mixture;
mixing the resulting mixture to obtain the paste.

16. The method according to claim 9, wherein the paste is deposited by screen printing.

17. The method according to claim 9, wherein annealing comprises:
heating the paste deposited metal separator at a rate of 0.5 to 1.5° C./min to 950 to 1050° C., followed by a primary annealing in a reducing atmosphere of 96% argon and 4% $H_2$ for 20 to 30 hours; and
cooling the primarily annealed metal separator at a rate of 0.5-1.5° C./min to 750 to 850° C., followed by secondary annealing in a nitrogen atmosphere for 20 to 30 hours.

18. The method according to claim 9, wherein the metal separator comprises an iron-chromium alloy.

\* \* \* \* \*